United States Patent
Shin (10) Patent No.: US 12,519,167 B2
(45) Date of Patent: Jan. 6, 2026

(54) BATTERY ASSEMBLY MOUNTING STRUCTURE FOR A VEHICLE

(71) Applicants: HYUNDAI MOTOR COMPANY, Seoul (KR); KIA CORPORATION, Seoul (KR)

(72) Inventor: Gyung Hoon Shin, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 590 days.

(21) Appl. No.: 17/984,009

(22) Filed: Nov. 9, 2022

(65) Prior Publication Data
US 2024/0021944 A1  Jan. 18, 2024

(30) Foreign Application Priority Data
Jul. 12, 2022  (KR) .......... 10-2022-0085742

(51) Int. Cl.
*H01M 50/249* (2021.01)
*H01M 50/262* (2021.01)

(52) U.S. Cl.
CPC ....... *H01M 50/249* (2021.01); *H01M 50/262* (2021.01); *H01M 2220/20* (2013.01)

(58) Field of Classification Search
CPC ... B60L 50/64; B60K 1/04; B60K 2001/0438; H01M 50/262
See application file for complete search history.

(56) References Cited

U.S. PATENT DOCUMENTS

| | | | | |
|---|---|---|---|---|
| 8,517,132 | B2* | 8/2013 | Heichal | H01M 50/244 180/68.5 |
| 2010/0288569 | A1* | 11/2010 | Fish | B60K 15/07 180/65.21 |
| 2012/0305323 | A1* | 12/2012 | Baboy | B60L 53/80 29/244 |
| 2013/0180791 | A1* | 7/2013 | Lejeune | B60K 1/04 180/68.5 |
| 2018/0062129 | A1* | 3/2018 | Hao | H01M 50/262 |
| 2018/0086193 | A1* | 3/2018 | Fu | H01R 33/975 |
| 2020/0321572 | A1* | 10/2020 | Bengtsson | H01M 50/264 |
| 2022/0194197 | A1* | 6/2022 | Park | H01M 50/249 |
| 2022/0203860 | A1* | 6/2022 | Zhang | B60L 53/80 |
| 2024/0326642 | A1* | 10/2024 | Khullar | B60L 53/80 |

FOREIGN PATENT DOCUMENTS

KR  20210001334 A  1/2021

* cited by examiner

*Primary Examiner* — Brian L Swenson
(74) *Attorney, Agent, or Firm* — Lempia Summerfield Katz LLC (57) ABSTRACT

A battery assembly mounting structure for a vehicle includes: a mounting bushing provided in a battery assembly to internally form a communication space in up and down directions; a fastening bolt installed to penetrate the space formed by the mounting bushing in the up and down directions; and a swappable assembly. The swappable assembly is elastically coupled to the mounting bushing and elastically supports the mounting bushing and the fastening bolt between the mounting bushing and the fastening bolt while elastically allowing the fastening bolt to move in a lengthwise direction.

20 Claims, 11 Drawing Sheets

BATTERY ASSEMBLY MOUNTING STRUCTURE FOR A VEHICLE

CROSS-REFERENCE TO RELATED APPLICATION

The present application claims priority to Korean Patent Application No. 10-2022-0085742, filed on Jul. 12, 2022, the entire contents of which are incorporated herein for all purposes by this reference.

BACKGROUND

Field of the Disclosure

The disclosure relates to a battery assembly mounting structure for a vehicle.

Description of the Related Art

An electric vehicle, a hybrid vehicle, or the like is mounted with a high voltage battery (hereinafter referred to as a "battery assembly"). The battery assembly is likely to be mounted to a lower side of a vehicle body.

In particular, an electric vehicle has a disadvantage in that its charging time is relatively longer than a refueling time of a general internal combustion engine vehicle. Therefore, a method of attaching and detaching a replaceable battery assembly to and from a vehicle body has been sought to solve this disadvantage.

Matters described as the related art are provided merely to help understand the background of the disclosure. Such matters should not be taken as the prior art already known to a person having ordinary skill in the art.

SUMMARY

An aspect of the disclosure is to provide a battery assembly mounting structure for a vehicle wherein a fastening bolt for mounting a battery assembly to a lower side of a vehicle body maintains an assembled state with the battery assembly even when the battery assembly is separated from the vehicle body. Thus, the fastening bolt can be reusable without the need to handle the fastening bolt separately from the battery assembly when the battery assembly is repetitively detached from and attached to the vehicle body.

Another aspect of the disclosure is to provide a battery assembly mounting structure for a vehicle wherein an assembly tolerance is easily covered when the battery assembly is mounted to the vehicle body and a fastening angle of a fastening bolt is appropriately guided to prevent erroneous fastening. Thus, the battery assembly mounting structure secures assembling and disassembling workability and provides easy replaceability of the fastening bolt when the fastening bolt is damaged.

Still, another aspect of the disclosure is to provide a battery assembly mounting structure for a vehicle where the structure can be easily replaced even while the battery assembly is mounted to the vehicle body, and where the battery assembly mounting structure itself needs to be replaced as it is damaged or deformed.

According to an embodiment of the disclosure, a battery assembly mounting structure for a vehicle includes: a mounting bushing provided in a battery assembly to internally form a communication space in up and down directions; a fastening bolt installed to penetrate the space formed by the mounting bushing in the up and down directions; and a swappable assembly. The swappable assembly is elastically coupled to the mounting bushing and elastically supports the mounting bushing and the fastening bolt between the mounting bushing and the fastening bolt while elastically allowing the fastening bolt to move in a lengthwise direction.

The swappable assembly may include: a first fixing guide rectilinearly oriented upward and coupled to the inside of the mounting bushing; a sleeve surrounding an outer circumference of the fastening bolt inside the first fixing guide; a second fixing guide provided between the first fixing guide and the sleeve; and a guide spring elastically supporting the sleeve with respect to the second fixing guide.

The first fixing guide may be formed so that movement in the up and down directions of the swappable assembly with respect to the mounting bushing can be constrained by the elasticity of the first fixing guide.

The mounting bushing may be shaped to have a cross-section evenly formed in the up and down directions. A fixing groove for fixing the first fixing guide may be formed on an inner surface of the mounting bushing. The first fixing guide may be integrally provided with a fixing protrusion that is elastically inserted in the fixing groove.

The sleeve may include: a cylindrical unit surrounding the outer circumference of the fastening bolt; an elastic supporter protruding downward from the cylindrical unit; and a plurality of holding protrusions protruding from the elastic supporter toward the inside of the cylindrical unit and pressing the outer circumference of the fastening bolt.

The holding protrusion may have a shape that becomes narrower toward the inside of the cylindrical unit and wider again upward from a lower end of the elastic supporter.

A cut-out groove for separating the elastic supporter from the cylindrical unit may be vertically formed between the elastic supporter and the cylindrical unit.

The cut-out groove may be formed to be longer than half of the vertical length of the cylindrical unit.

The guide spring may include a plurality of leaf springs connecting the second fixing guide and the sleeve. A surface of the leaf springs may be disposed in parallel with the lengthwise direction of the sleeve.

The guide spring may include the plurality of leaf springs disposed between the second fixing guide and the sleeve to form a vertex shape centered upon the sleeve.

The mounting bushing may be coupled to a side member of the battery assembly. The side member may include a lower end supporter to support the lower end of the mounting bushing. The lower end supporter may be formed with an assembly through hole via which the swappable assembly passes and enters the mounting bushing.

The side member may further include a surrounding supporter disposed above the lower end supporter and surrounding and supporting the mounting bushing.

The side member may further include a head cover disposed below the lower end supporter and having a head through hole through which the head of the fastening bolt passes.

Further, according to an embodiment of the disclosure, a battery assembly mounting structure for a vehicle, includes: a battery assembly provided with an opening of which a cross-section is evenly formed from a lower side toward an upper side; a fixing groove formed inside the opening; and a swappable assembly. The swappable assembly is elastically coupled to the fixing groove and elastically supports the fastening bolt vertically passing therethrough.

The opening may be formed in a mounting bushing coupled to the side member of the battery assembly.

The side member may include a structure having a cross-section whereby a lower end supporter, which supports a lower end of the mounting bushing, and a surrounding supporter, which supports the circumference of the mounting bushing, are separated up and down from each other.

The side member may include a structure having a cross-section whereby a head cover formed with a head through hole and passing a head of the fastening bolt is disposed as separated from the lower side of the lower end supporter.

The opening may be formed in a through pipe of the battery assembly.

The swappable assembly may include: a first fixing guide including a fixing protrusion elastically coupled to the fixing groove and coupled to the inside of the opening; a sleeve surrounding the outer circumference of the fastening bolt inside the first fixing guide; a second fixing guide installed between the first fixing guide and the sleeve; and a guide spring elastically supporting the sleeve with respect to the second fixing guide.

The sleeve may include: a cylindrical unit guiding the fastening bolt to rectilinearly move up and down while surrounding the outer circumference of the fastening bolt; a plurality of elastic supporters protruding downward from the cylindrical unit; a holding protrusion having a shape that is narrower toward the inside of the cylindrical unit and wider upward from a lower end of the elastic supporter; and a plurality of cut-out grooves vertically cut out from the cylindrical unit and separating the elastic supporter and the cylindrical unit from each other.

According to the disclosure, a fastening bolt for mounting a battery assembly to a lower side of a vehicle body maintains an assembled state with the battery assembly even when the battery assembly is separated from the vehicle body. Thus, the fastening bolt can be reusable without the need for handling the fastening bolt separately from the battery assembly when the battery assembly is repetitively detached from and attached to the vehicle body.

Further, an assembly tolerance is easily covered when the battery assembly is mounted to the vehicle body and a fastening angle of a fastening bolt is appropriately guided to prevent erroneous fastening. Assembly and disassembly workability is thereby secured and easy replaceability of the fastening bolt is provided when the fastening bolt is damaged.

In addition, a battery assembly mounting structure for a vehicle according to the disclosure is easily replaceable even while the battery assembly is mounted to the vehicle body and where the battery assembly mounting structure itself needs to be replaced as it is damaged or deformed.

DETAILED DESCRIPTION

Hereinafter, embodiments of the disclosure are described in detail with reference to the accompanying drawings. In the drawings, the same or similar elements are denoted by the same reference numerals even though they are depicted in different drawings, and redundant descriptions thereof have been omitted.

Suffixes "module" and "unit" put after elements in the following description are given in consideration of only ease of description and do not have meaning or functions discriminated from each other.

In terms of describing the embodiments of the disclosure, detailed descriptions of related art have been omitted where such descriptions make the subject matter of the embodiments of the disclosure rather unclear. In addition, the accompanying drawings are provided only to better understand the embodiments of the disclosure and are not intended to limit technical ideas of the disclosure. Therefore, it should be understood that the accompanying drawings include all modifications, equivalents, and substitutions within the scope and spirit of the disclosure.

Terms such as "first" and "second" may be used to describe various components, but the components should not be limited by the above terms. In addition, the above terms are used only for the purpose of distinguishing one component from another.

When it is described that one component is "connected" or "joined" to another component, it should be understood that the one component may be directly connected or joined to another component, but additional components may be present therebetween. However, when one component is described as being "directly connected," or "directly coupled" to another component, it should be understood that additional components may be absent between the one component and another component.

Unless the context clearly dictates otherwise, singular forms include plural forms as well. When a component, device, element, or the like of the present disclosure is described as having a purpose or performing an operation, function, or the like, the component, device, or element should be considered herein as being "configured to" meet that purpose or to perform that operation or function.

In the disclosure, it should be understood that terms such as "include" or "have" indicate that a feature, a number, a step, an operation, an element, a part, or the combination thereof described in the embodiments is present. However, the terms "include" or "have" do not preclude a possibility of the presence or addition of one or more other features, numbers, steps, operations, elements, parts, or combinations thereof, in advance.

Further, terms such as "unit" or "control unit" forming part of the names of a motor control unit (MCU), a hybrid control unit (HCU), or the like are merely terms that are widely used in the naming of a controller for controlling a specific function of a vehicle. The terms should not be construed as meaning a generic function unit.

A controller may include: a communication device that communicates with other control units or sensors to control the function that is responsible therefor; a memory that stores an operating system, logic commands, and input/output information; and one or more processors that perform identification, calculation, decision, and the like, which is necessary for the control of the function that is responsible therefor.

Referring to FIGS. 1-9, a battery assembly mounting structure for a vehicle according to an embodiment of the disclosure includes a mounting bushing 3 provided in a battery assembly 1 to internally form a communication space in up and down directions (e.g., relatively or generally vertical directions). The battery assembly mounting structure also includes a fastening bolt 5 installed to penetrate the space formed by the mounting bushing 3 in the up and down directions and a swappable assembly 7. The swappable assembly 7 is elastically coupled to the mounting bushing 3 and is rectilinearly moved upward into the opening when inserted or installed in the mounting bushing. The swappable assembly also elastically supports the mounting bushing 3 and the fastening bolt 5 and is disposed between them while elastically allowing the fastening bolt 5 to move in a lengthwise direction.

In other words, according to the disclosure, the battery assembly 1 is mounted to the lower side of a vehicle body by the fastening bolt 5 and the fastening bolt 5 penetrates the mounting bushing 3 through the swappable assembly 7 in the up and down directions.

The swappable assembly 7 elastically allows the fastening bolt 5 to move in the lengthwise direction, i.e., generally vertical, relatively vertical, or in the up and down directions.

Therefore, the fastening bolt 5 is rectilinearly movable with respect to the swappable assembly 7 in the up and down directions when a force acting on the fastening bolt 5 in the up and down directions is sufficient enough to overcome the elasticity of the swappable assembly 7. However, the fastening bolt 5 is immovable with respect to the swappable assembly 7 when the force acting in the up and down directions does not overcome the elasticity.

The elasticity of the swappable assembly 7 acting on the fastening bolt 5 is based on the elasticity applied by an elastic supporter 11 and a holding protrusion 13 of a sleeve 9 as described below. The elasticity is sufficient to allow the fastening bolt 5 to rectilinearly move in the up and down directions with respect to a force exerted by a tool for fastening the fastening bolt 5. The elasticity is also sufficient to hold the fastening bolt 5 when the fastening bolt 5 is released from the vehicle body. The weight of the fastening bolt 5 acts on the swappable assembly 7. Therefore, the fastening bolt 5 continuously operates together with the battery assembly 1 even though the fastening bolt 5 is released from the vehicle body. Additionally, the fastening bolt 5 is reusable without the need to handle the fastening bolt 5 separately from the battery assembly 1 when the battery assembly 1 is repetitively detached from and attached to the vehicle body.

Figure 2:
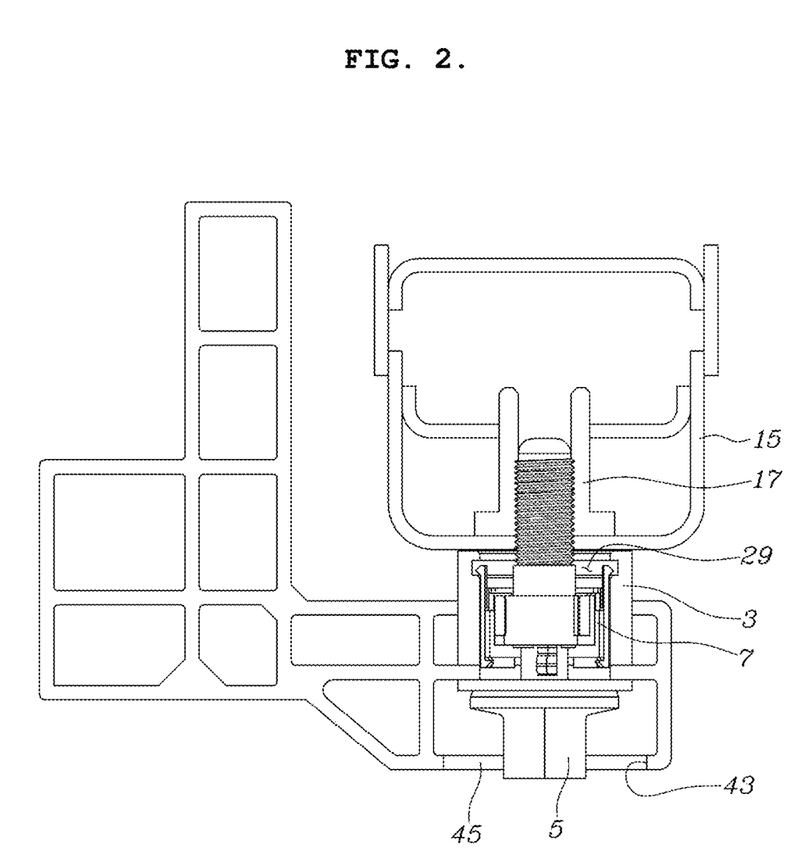
FIG. 2 is a cross-section view taken along line II-II of FIG. 1.

Referring to FIG. 2, a vehicle body 15 is positioned above the mounting bushing 3. The vehicle body 15 includes a weld nut 17 so that the fastening bolt 5 can be fastened to the weld nut 17, thereby attaching the battery assembly 1 to the vehicle body 15.

The meaning of 'vehicle body' as used herein includes a frame of a vehicle, which has a separate frame. The battery assembly 1 according to the disclosure is applicable not only to a vehicle that includes the frame separately from the vehicle body, but also to a vehicle that has a monocoque vehicle body or unibody structure with no distinction between the frame and the vehicle body. Therefore, the term 'vehicle body' is intended to cover all such vehicles.

The element substantially positioned above the mounting bushing 3 of FIG. 2 may thus be a frame of the vehicle where the vehicle has the separate frame or may be a vehicle body member where the vehicle has the unibody structure or monocoque vehicle body.

Figure 1:
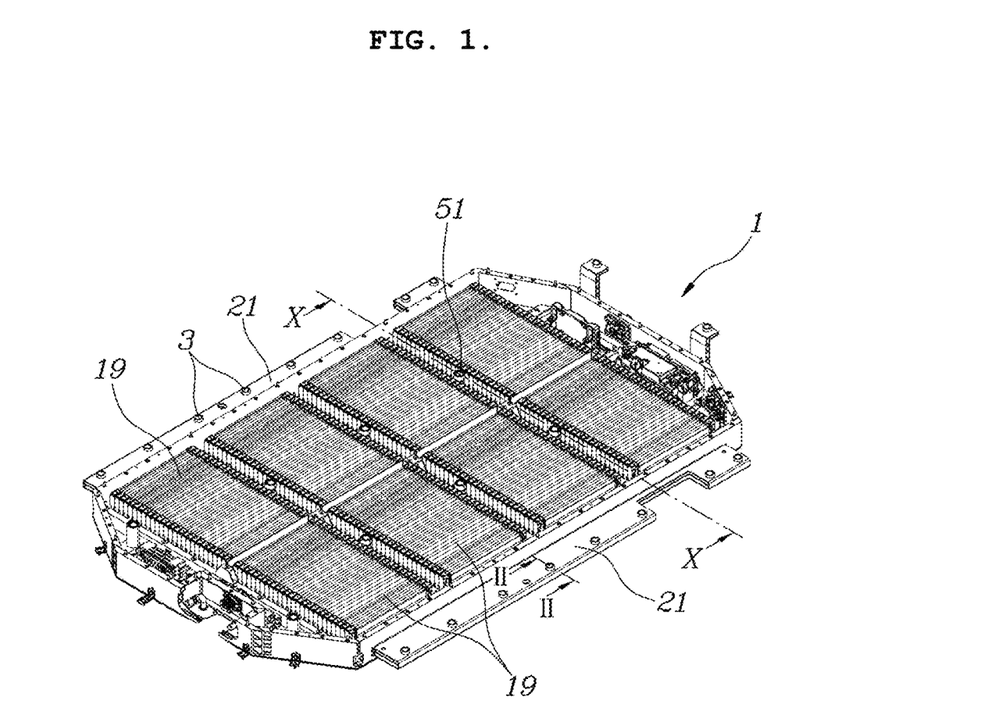
FIG. 1 is a view illustrating a battery assembly of a vehicle to which a mounting structure according to the disclosure is applied.

Further, the battery assembly 1 may have a structure as shown in FIG. 1, in which a plurality of battery modules 19 are loaded and surrounded with a side member 21. In the state as shown in FIG. 1, an upper cover (not shown) is substantially added to the upper side and configured to protect the battery modules 19 therein.

Figure 5:
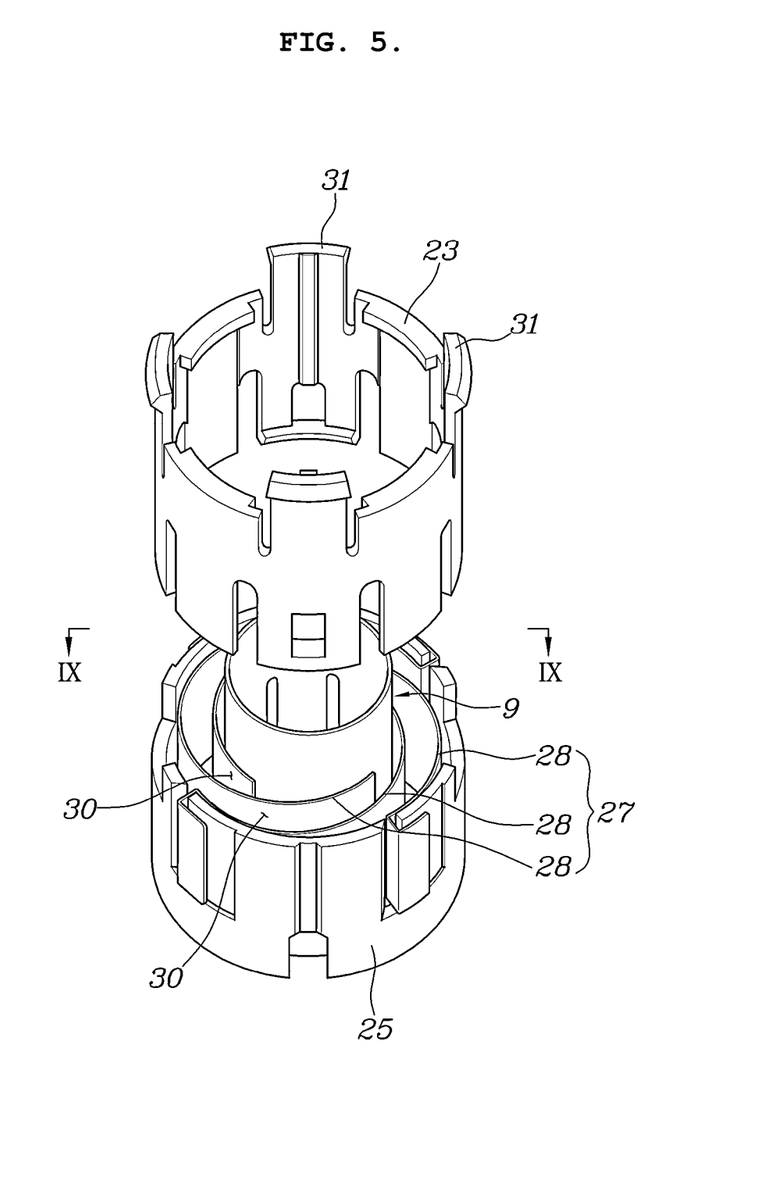
FIG. 5 is a view illustrating a detailed structure of a swappable assembly.
Figure 6:
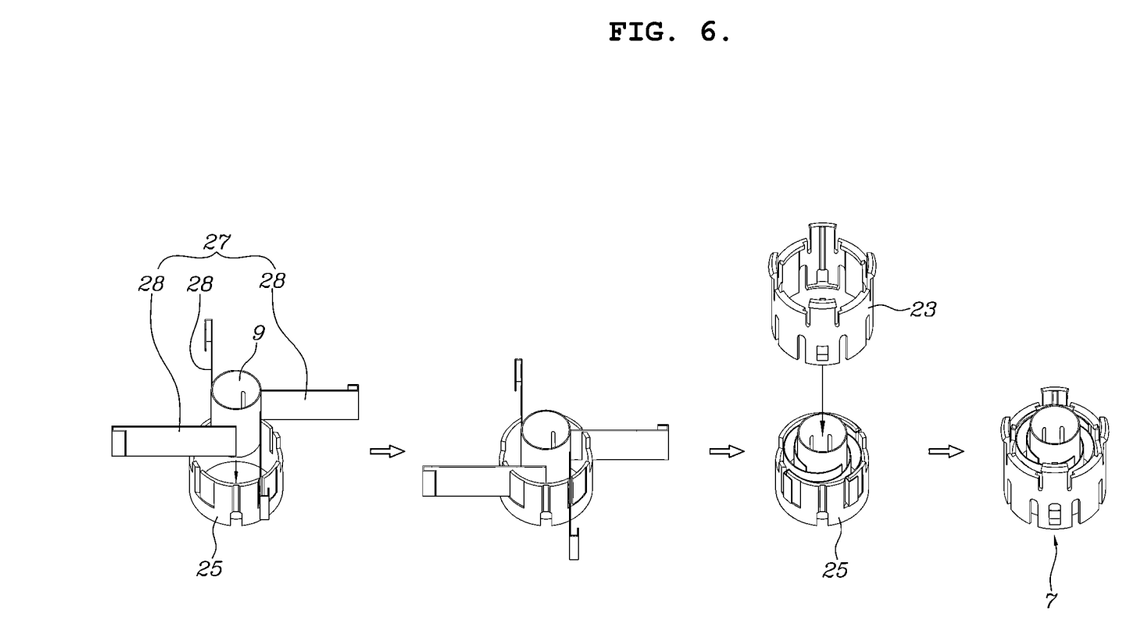
FIG. 6 is a view illustrating an assembly method of a swappable assembly.

The swappable assembly 7 includes: a first fixing guide 23 rectilinearly oriented upward and coupled to the inside of the mounting bushing 3; the sleeve 9 surrounding the outer circumference of the fastening bolt 5 inside the first fixing guide 23; a second fixing guide 25 provided between the first fixing guide 23 and the sleeve 9; and a guide spring 27 elastically supporting the sleeve 9 with respect to the second fixing guide 25.

Figure 3:
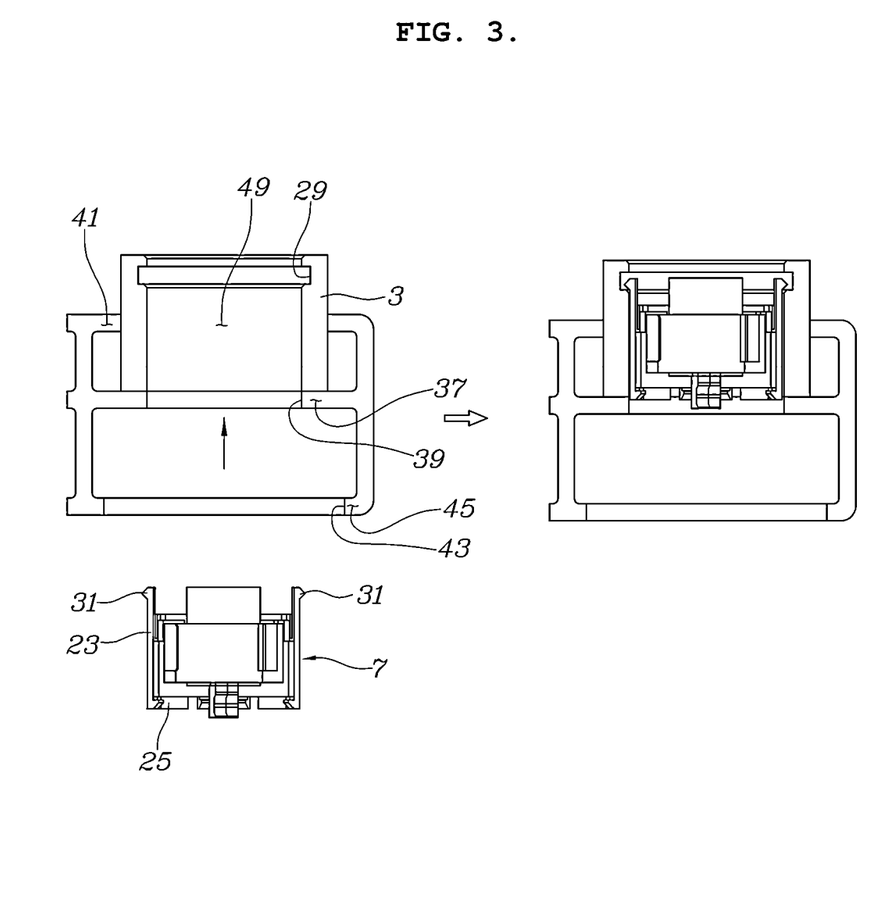
FIG. 3 is a view illustrating a process where a swappable assembly is coupled to a mounting bushing of a side member.
Figure 4:
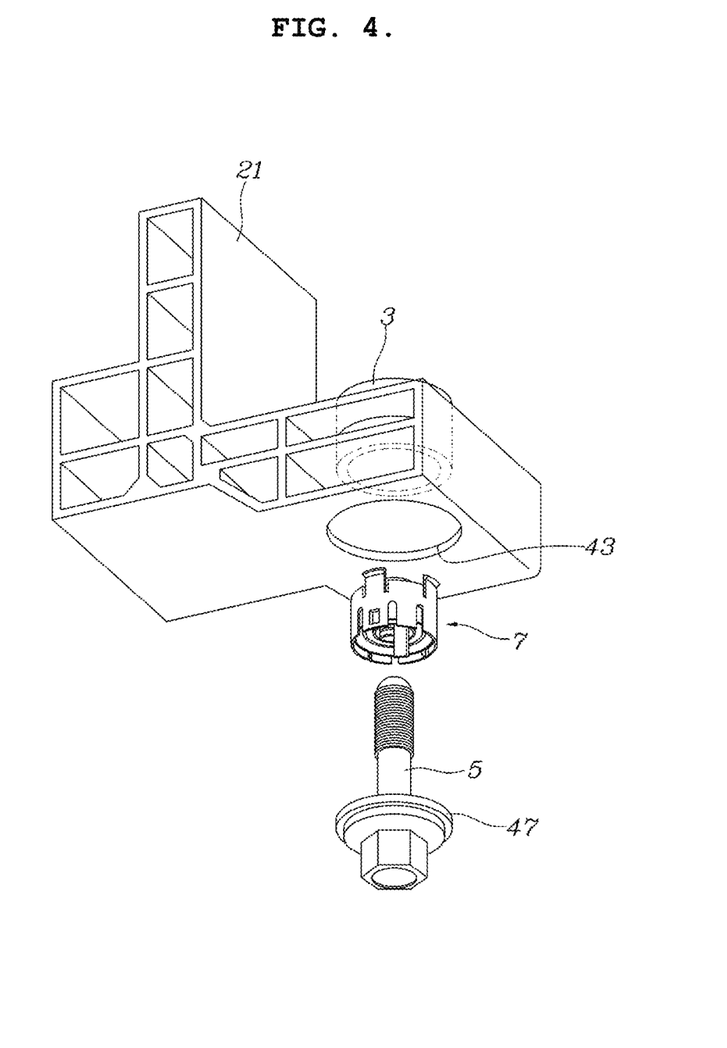
FIG. 4 is a view three-dimensionally illustrating that a swappable assembly and a fastening bolt are coupled to a mounting bushing of a side member.

In other words, the mounting bushing 3 is shaped to have a cross-section that is evenly formed in the up and down directions (e.g., generally or relatively vertical directions). Further, a fixing groove 29 for fixing the first fixing guide 23 is formed on an inner surface of the mounting bushing 3. Additionally, the first fixing guide 23 is integrally provided with a fixing protrusion 31 to be elastically inserted in the fixing groove 29 when the first fixing guide 23 is inserted in the mounting bushing 3. In other words, the fixing protrusion 31 can be inserted in the fixing groove 29 with its own elasticity when the first fixing guide 23 is inserted in the mounting bushing 3 in a rectilinearly upward direction as shown in FIG. 3. Thus, the movement of the swappable assembly in the up and down directions can be constrained with respect to the mounting bushing 3.

Therefore, when some among a plurality of swappable assemblies 7 provided in the battery assembly 1 are damaged or broken, a person can remove only the damaged or broken swappable assemblies 7 that are required to be replaced by pulling them down from the mounting bushing 3. Further, new swappable assemblies 7 can be coupled to the mounting bushing 3 by inserting them rectilinearly upward into the mounting bushings 3 when the battery assembly 1 is mounted to the lower side of the vehicle body. In other words, each swappable assembly 7 is replaceable without completely separating the battery assembly 1 from the vehicle body.

Figure 7:
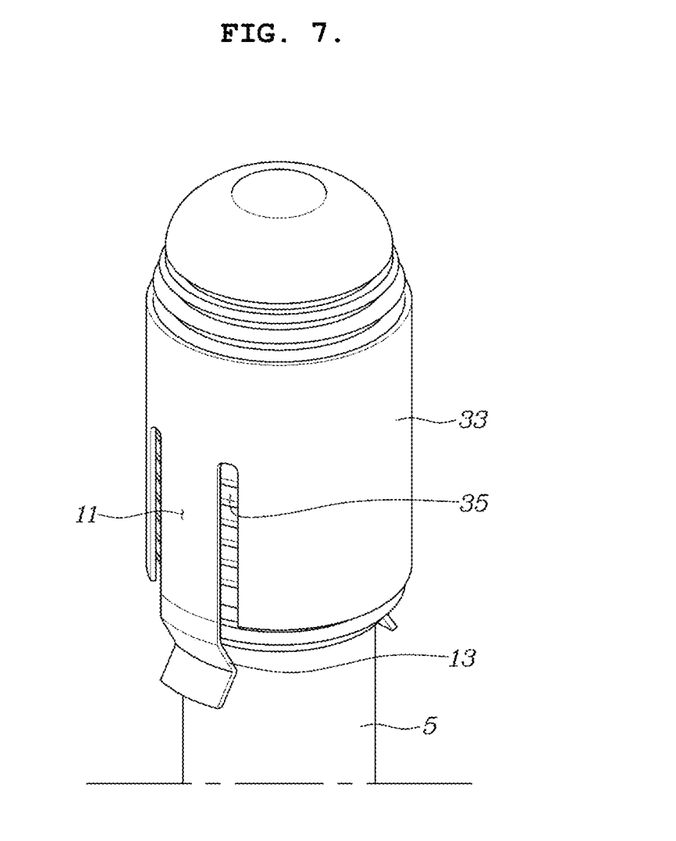
FIG. 7 is a view illustrating a detailed structure of a sleeve of the swappable assembly.

The sleeve 9 includes: a cylindrical unit 33 surrounding the outer circumference of the fastening bolt 5; the elastic supporter 11 protruding downward from the cylindrical unit 33; and a plurality of holding protrusions 13. The plurality of holding protrusions 13 protrude from the elastic supporter 11 toward the inside of the cylindrical unit 33 and press against the outer circumference of the fastening bolt 5.

The holding protrusions 13 each have a shape that becomes narrower toward the inside of the cylindrical unit 33 and wider upward from a lower end of the elastic supporter 11.

Figure 8:
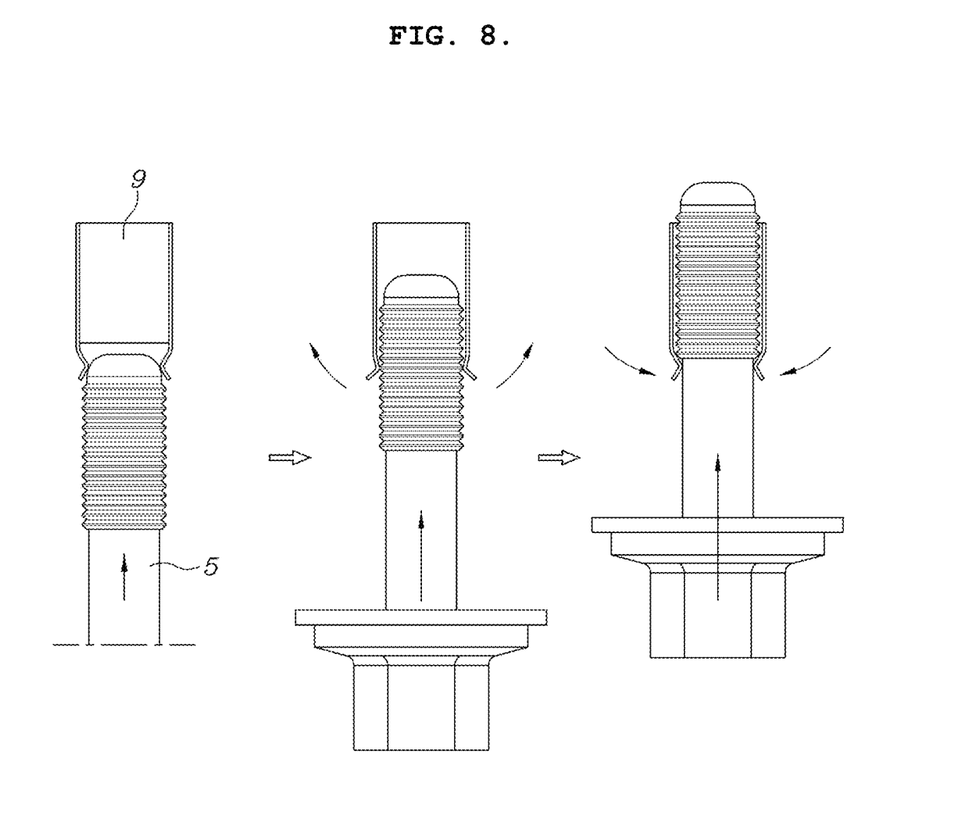
FIG. 8 is a view illustrating operations of an elastic supporter and holding protrusion of a sleeve.

Therefore, as illustrated in FIG. 8, when the fastening bolt 5 is rectilinearly moved upward from the lower side of the sleeve 9, the fastening bolt 5 is guided by the holding protrusions 13 of the sleeve 9 to enter the cylindrical unit 33.

The elastic supporter 11 is elastically opened to allow the fastening bolt 5 to move up through the cylindrical unit 33 as the fastening bolt 5 rises. Thus, all the threads of the fastening bolt 5 move to the upper side of the holding protrusion 13 and fasten to the weld nut 17 of the vehicle body.

A cut-out groove 35 is vertically formed between the elastic supporter 11 and the cylindrical unit 33 to separate the elastic supporter 11 from the cylindrical unit 33. The cut-out groove 35 is vertically formed between the elastic supporter 11 and the cylindrical unit 33 so that the elastic supporter 11 can be easily transformed to allow the entry of the fastening bolt 5 when the fastening bolt 5 is rectilinearly moved upward and inserted in the sleeve 9.

As above, to make the fastening bolt 5 easily enter the sleeve 9 (e.g., efficiently), as shown in FIG. 7, the cut-out groove 35 may be formed to be longer than half of the vertical length of the cylindrical unit 33.

Of course, as described herein, the elasticity of the elastic supporter 11 and the holding protrusion 13 makes the fastening bolt 5, when inserted in the sleeve 9, not separate from the sleeve 9 unless an additional external force acts thereon.

Figure 9:
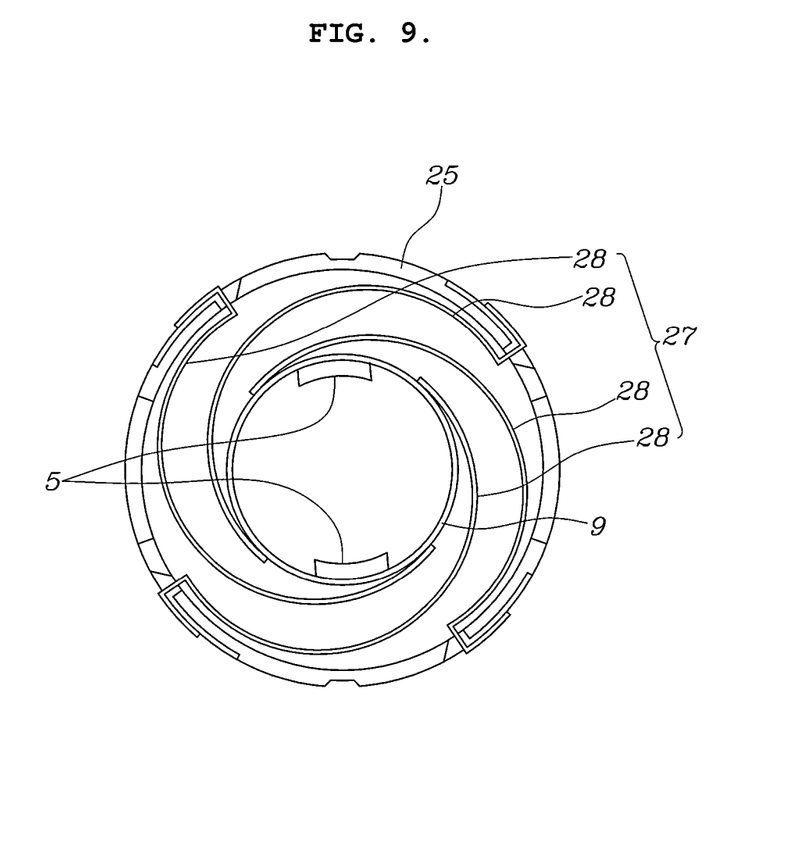
FIG. 9 is a view taken along IX-IX of FIG. 5.

The guide spring 27 includes a plurality of leaf springs 28 connecting the second fixing guide 25 and the sleeve 9. Additionally, a surface 30 of the leaf spring 28 is disposed in parallel with the lengthwise direction of the sleeve 9.

The surface of the leaf spring may be the largest area of the leaf spring. The surface of the leaf spring is disposed to form a plane perpendicular to the lengthwise direction of the sleeve 9. Thus, the guide spring 27 can be transformed on the plane (the same plane as shown in FIG. 9) perpendicular to the lengthwise direction of the sleeve 9, if possible.

In other words, the guide spring 27 includes the plurality of leaf springs disposed between the second fixing guide 25 and the sleeve 9 to form a vortex shape centered upon the sleeve 9 as shown in FIG. 9. Thus, the guide spring 27 is immediately restored to its original position and posture even when the sleeve is moved or changed in posture within the second fixing guide 25.

Therefore, the sleeve 9 can guide the fastening bolt 5 to always maintain a fastening angle in a correct posture and a stable state. In addition, the sleeve 9 can further press the fastening bolt 5 upward so that the center of the sleeve 9 can be automatically aligned with the center of the weld nut 17 even though the center of the fastening bolt 5 is slightly misaligned with the center of the weld nut 17 of the vehicle body, thereby having an effect on guiding the fastening bolt 5 to be smoothly and stably fastened to the weld nut 17.

The mounting bushing 3 is, as described herein, coupled to the side member 21 of the battery assembly 1. The side member 21 includes a lower end supporter 37 supporting the lower end of the mounting bushing 3. Further, the lower end supporter 37 is formed with an assembly through hole 39 via which the swappable assembly 7 passes and enters the mounting bushing 3.

Therefore, the assembly through hole 39 allows the swappable assembly 7 to be easily coupled to the mounting bushing 3 from a lower side toward an upper side. Further, the assembly through hole 39 allows the swappable assembly 7 to be easily separated from the mounting bushing 3 from the upper side toward the lower side while securing a structure for firmly coupling the lower end of the mounting bushing 3 to the lower end supporter 37.

The side member 21 further includes a surrounding supporter 41 disposed above the lower end supporter 37 and surrounding and supporting the mounting bushing 3.

Therefore, the lower end of the mounting bushing 3 is supported on the lower end supporter 37. At the same time, the circumference of the mounting bushing 3 is integrated into the surrounding supporter 41 by welding or the like, thereby firmly coupling with the side member 21.

Further, according to an embodiment, the side member 21 additionally includes a head cover 45 placed below the lower end supporter 37 and having a head through hole 43 through which the head of the fastening bolt 5 passes.

Therefore, the head cover 45 formed with the head through hole 43 allows the head of the fastening bolt 5 and a washer 47 to pass therethrough from the lower side toward the upper side. Further, at the same time, the head cover 45 forms a compact structure surrounding at least a part of the head of the fastening bolt 5, as shown in FIG. 2, where the fastening bolt 5 is completely fastened to the weld nut 17 of the vehicle body.

Further, the head through hole 43 serves to guide a tool to be inserted therethrough when the tool is used in loosening the fastening bolt 5, thereby having an effect on improving maintenance.

The foregoing battery assembly mounting structure for the vehicle, according to the disclosure, may also be described as follows.

In other words, the structure for mounting the battery assembly 1 to the vehicle according to an embodiment of the disclosure includes: the battery assembly 1 provided with an opening 49 of which a cross-section is evenly formed from the lower side toward the upper side; the fixing groove 29 formed inside the opening 49; and the swappable assembly 7. The swappable assembly 7 is elastically coupled to the fixing groove 29, when rectilinearly moved or inserted from the lower side toward the upper side of the opening 49 and elastically supports the fastening bolt 5 vertically passing therethrough.

The opening 49 may be formed in the mounting bushing 3 coupled to the side member 21 of the battery assembly 1.

The side member 21 may have a structure, the cross-section of which shows that the lower end supporter 37, which supports the lower end of the mounting bushing 3, and the surrounding supporter 41, which supports the circumference of the mounting bushing 3, are separated up and down (e.g., vertically) from each other.

The side member 21 may have a structure, the cross-section having the head cover 45, formed with the head through hole 43 passing the head of the fastening bolt 5, disposed as separated from the lower side of the lower end supporter 37.

Figure 10:
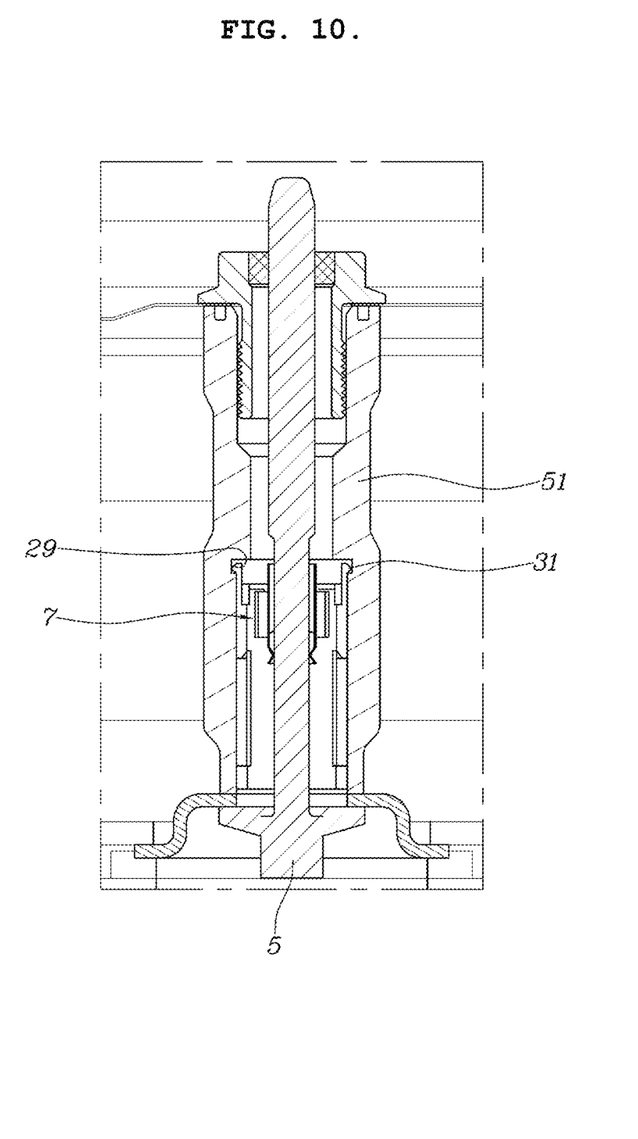
FIG. 10 is a longitudinal cross-section view of a through pipe, taken along line X-X of FIG. 1.
Figure 11:
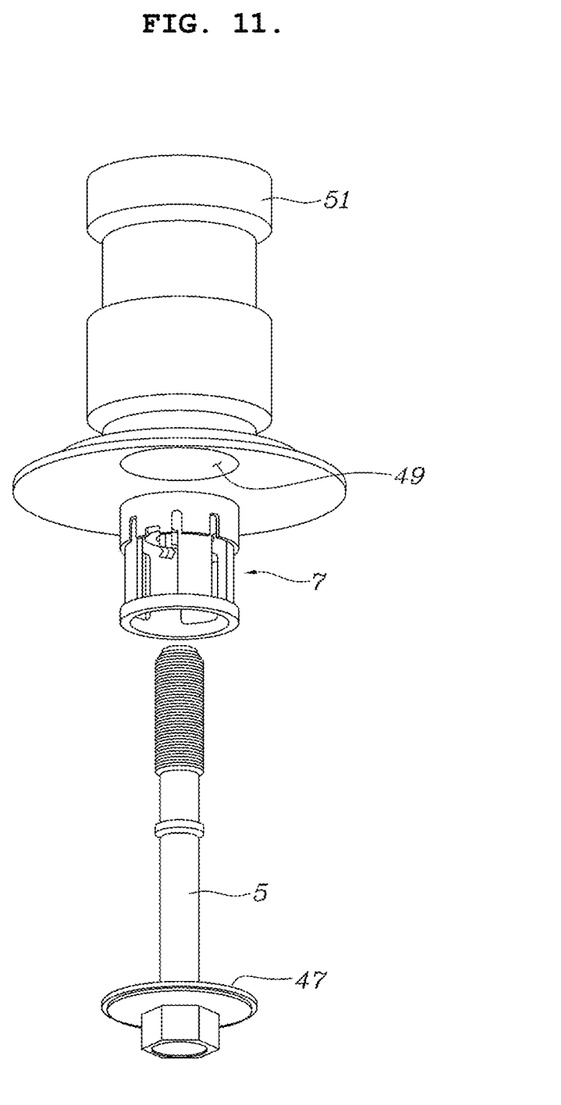
FIG. 11 is a view three-dimensionally illustrating that a swappable assembly and a fastening bolt are coupled to the through pipe of FIG. 10.

Further, as shown in FIGS. 10 and 11, the opening 49 may be formed in a through pipe 51 of the battery assembly 1.

In this case, the swappable assembly 7 is elastically hooked to the fixing groove 29 formed inside the through pipe 51.

The swappable assembly 7 includes the first fixing guide 23 having the fixing protrusion 31 to be elastically coupled to the fixing groove 29 and coupled to the inside of the opening 49 when the swappable assembly 7 is rectilinearly moved upward toward the opening 49. The swappable assembly 7 further includes: the sleeve 9 surrounding the outer circumference of the fastening bolt 5 inside the first fixing guide 23; the second fixing guide 25 installed between the first fixing guide 23 and the sleeve 9; and the guide spring 27 elastically supporting the sleeve 9 with respect to the second fixing guide 25.

The sleeve 9 may include: the cylindrical unit 33 guiding the fastening bolt 5 to rectilinearly move up and down while surrounding the outer circumference of the fastening bolt 5;

the plurality of elastic supporters 11 protruding downward from the cylindrical unit 33; the holding protrusion 13 having a shape that becomes narrower toward the inside of the cylindrical unit 33 and wider again upward from a lower end of the elastic supporter 11; and the plurality of cut-out grooves 35. The plurality of cut-out grooves 35 is vertically cut out from the cylindrical unit 33 and separates the elastic supporter 11 and the cylindrical unit 33 from each other.

Although specific embodiments of the disclosure have been illustrated and described, various modifications and changes can be made by a person having ordinary skill in the art without departing from the scope of technical ideas defined by the appended claims.

What is claimed is:

1. A battery assembly mounting structure for a vehicle, comprising:
   a mounting bushing provided in a battery assembly to internally form a communication space in up and down directions;
   a fastening bolt installed to penetrate the space formed by the mounting bushing in the up and down directions; and
   a swappable assembly elastically coupled to the mounting bushing and elastically supporting between the mounting bushing and the fastening bolt while gripping the fastening bolt to prevent detachment from the battery assembly, guiding a posture of the fastening bolt when fastened to a vehicle body, and elastically allowing the fastening bolt to move in a lengthwise direction.

2. The battery assembly mounting structure of claim 1, wherein the swappable assembly comprises:
   a first fixing guide rectilinearly oriented upward and coupled to an inside of the mounting bushing;
   a sleeve surrounding an outer circumference of the fastening bolt inside the first fixing guide;
   a second fixing guide provided between the first fixing guide and the sleeve; and
   a guide spring elastically supporting the sleeve with respect to the second fixing guide.

3. The battery assembly mounting structure of claim 2, wherein the first fixing guide is formed so that movement in the up and down directions with respect to the mounting bushing can be constrained by the elasticity of the first fixing guide.

4. The battery assembly mounting structure of claim 3, wherein:
   the mounting bushing is shaped to have a cross-section evenly formed in up and down directions;
   a fixing groove for fixing the first fixing guide is formed on an inner surface of the mounting bushing; and
   the first fixing guide is integrally provided with a fixing protrusion elastically inserted in the fixing groove.

5. The battery assembly mounting structure of claim 2, wherein the sleeve comprises:
   a cylindrical unit surrounding the outer circumference of the fastening bolt;
   an elastic supporter protruding downward from the cylindrical unit; and
   a plurality of holding protrusions protruding from the elastic supporter toward an inside of the cylindrical unit and pressing the outer circumference of the fastening bolt.

6. The battery assembly mounting structure of claim 5, wherein the holding protrusion has a shape that becomes narrower toward the inside of the cylindrical unit and wider upward from a lower end of the elastic supporter.

7. The battery assembly mounting structure of claim 5, wherein a cut-out groove for separating the elastic supporter from the cylindrical unit is vertically formed between the elastic supporter and the cylindrical unit.

8. The battery assembly mounting structure of claim 7, wherein the cut-out groove is formed to be longer than half of a vertical length of the cylindrical unit.

9. The battery assembly mounting structure of claim 2, wherein:
   the guide spring comprises a plurality of leaf springs connecting the second fixing guide and the sleeve; and
   a surface of each of the plurality of leaf springs is disposed in parallel with the lengthwise direction of the sleeve.

10. The battery assembly mounting structure of claim 9, wherein the guide spring comprises the plurality of leaf springs disposed between the second fixing guide and the sleeve to form a vertex shape centered upon the sleeve.

11. The battery assembly mounting structure of claim 2, wherein:
   the mounting bushing is coupled to a side member of the battery assembly;
   the side member comprises a lower end supporter to support the lower end of the mounting bushing; and
   the lower end supporter is formed with an assembly through hole via which the swappable assembly passes and enters the mounting bushing.

12. The battery assembly mounting structure of claim 11, wherein the side member further comprises a surrounding supporter disposed above the lower end supporter and surrounding and supporting the mounting bushing.

13. The battery assembly mounting structure of claim 11, wherein the side member further comprises a head cover disposed below the lower end supporter and comprising a head through hole through which the head of the fastening bolt passes.

14. A battery assembly mounting structure for a vehicle, comprising:
   a battery assembly provided with an opening of which a cross-section is evenly formed from a lower side toward an upper side;
   a fixing groove formed inside the opening; and
   a swappable assembly elastically coupled to the fixing groove and elastically supporting a fastening bolt vertically passing therethrough by gripping the fastening bolt to prevent detachment from the battery assembly and guiding a posture of the fastening bolt when fastened to a vehicle body.

15. The battery assembly mounting structure of claim 14, wherein the opening is formed in a mounting bushing coupled to a side member of the battery assembly.

16. The battery assembly mounting structure of claim 15, wherein the side member comprises a structure, a cross-section of which has a lower end supporter, which supports a lower end of the mounting bushing, and a surrounding supporter, which supports a circumference of the mounting bushing separated up and down from each other.

17. The battery assembly mounting structure of claim 16, wherein the side member comprises a structure, a cross-section of which has a head cover formed with a head through hole passing a head of the fastening bolt and disposed as separated from the lower side of the lower end supporter.

18. The battery assembly mounting structure of claim 14, wherein the opening may be formed in a through pipe of the battery assembly.

19. The battery assembly mounting structure of claim 14, wherein the swappable assembly comprises:
- a first fixing guide including a fixing protrusion elastically coupled to the fixing groove and coupled to the inside of the opening;
- a sleeve surrounding an outer circumference of the fastening bolt inside the first fixing guide;
- a second fixing guide installed between the first fixing guide and the sleeve; and
- a guide spring elastically supporting the sleeve with respect to the second fixing guide.

20. The battery assembly mounting structure of claim 19, wherein the sleeve comprises:
- a cylindrical unit guiding the fastening bolt to rectilinearly move up and down while surrounding the outer circumference of the fastening bolt;
- a plurality of elastic supporters protruding downward from the cylindrical unit;
- a holding protrusion having a shape that becomes narrower toward the inside of the cylindrical unit and wider upward from a lower end of the elastic supporter; and
- a plurality of cut-out grooves vertically cut out from the cylindrical unit and separating the elastic supporter and the cylindrical unit from each other.

* * * * *